*(12)* United States Patent
Shein et al.

(10) Patent No.: US 8,335,787 B2
(45) Date of Patent: Dec. 18, 2012

(54) TOPIC WORD GENERATION METHOD AND SYSTEM

(75) Inventors: Fraser Shein, Toronto (CA); Tom C Nantais, Toronto (CA); Dan Li, Toronto (CA)

(73) Assignee: Quillsoft Ltd., Toronto (CA)

( * ) Notice: Subject to any disclaimer, the term of this patent is extended or adjusted under 35 U.S.C. 154(b) by 0 days.

(21) Appl. No.: 13/058,062

(22) PCT Filed: Nov. 7, 2008

(86) PCT No.: PCT/CA2008/001972
§ 371 (c)(1),
(2), (4) Date: Jun. 8, 2011

(87) PCT Pub. No.: WO2010/015068
PCT Pub. Date: Feb. 11, 2010

(65) Prior Publication Data
US 2011/0231411 A1    Sep. 22, 2011

(30) Foreign Application Priority Data
Aug. 8, 2008    (CA) .................................... 2638558

(51) Int. Cl.
*G06F 17/30*    (2006.01)
(52) U.S. Cl. ................... 707/730; 707/749; 707/750
(58) Field of Classification Search .............. 707/705, 707/736–738, 749–750
See application file for complete search history.

(56) References Cited

U.S. PATENT DOCUMENTS

| | | | |
|---|---|---|---|
| 5,805,911 A | 9/1998 | Miller | |
| 5,940,624 A | 8/1999 | Kadashevich et al. | |
| 5,987,460 A | 11/1999 | Niwa et al. | |
| 6,233,575 B1 * | 5/2001 | Agrawal et al. | ........................ 1/1 |
| 6,542,889 B1 | 4/2003 | Aggarwal et al. | |
| 6,678,694 B1 * | 1/2004 | Zimmermann et al. | ...... 707/731 |
| 6,691,108 B2 | 2/2004 | Li | |
| 6,782,510 B1 | 8/2004 | Gross et al. | |
| 7,181,451 B2 | 2/2007 | Dehlinger et al. | |

(Continued)

FOREIGN PATENT DOCUMENTS

CA    2638558 A1    2/2010
(Continued)

OTHER PUBLICATIONS

Foreign communication from a related counterpart application—International Preliminary Report on Patentability, PCT/CA2008/001972, Nov. 2, 2010, 5 pages.

(Continued)

*Primary Examiner* — Hanh Thai
(74) *Attorney, Agent, or Firm* — Conley Rose, P.C.; Rodney B. Carroll

(57) ABSTRACT

A method of, and system for, extracting topic words from a collection of documents across multiple and potentially very large number of domains. Documents are selected and ranked based on similarity with at least one seed word, which defines a topic. Seed words may be entered directly by a user or provided by another application. Keywords are extracted from documents determined to be a sufficiently good match to the topic and may be displayed to the user or used as input into word prediction or word analysis and display software. Documents are determined to be a sufficiently good match to the topic using an iterative algorithm starting with the best match and selecting documents containing keywords sufficiently similar to the previously selected documents.

28 Claims, 1 Drawing Sheet

U.S. PATENT DOCUMENTS

| | | |
|---|---|---|
| 7,269,546 B2 | 9/2007 | Stensmo |
| 7,350,145 B2 | 3/2008 | Wolpe |
| 7,359,891 B2 | 4/2008 | Nishino et al. |
| 7,558,778 B2 | 7/2009 | Carus et al. |
| 2001/0037324 A1* | 11/2001 | Agrawal et al. ............. 707/1 |
| 2005/0108200 A1* | 5/2005 | Meik et al. ............. 707/3 |
| 2005/0125429 A1* | 6/2005 | Corston-Oliver et al. .... 707/100 |
| 2006/0271526 A1* | 11/2006 | Charnock et al. ............. 707/3 |
| 2008/0306914 A1* | 12/2008 | Jensen ............. 707/3 |
| 2009/0228468 A1* | 9/2009 | Qin et al. ............. 707/5 |
| 2010/0114561 A1* | 5/2010 | Yasin ............. 704/9 |

FOREIGN PATENT DOCUMENTS

| | | |
|---|---|---|
| WO | 2010015068 A1 | 2/2010 |

OTHER PUBLICATIONS

Foreign communication from a related counterpart application—International Search Report and Written Opinion, PCT/CA2008/001972, Apr. 22, 2009, 8 pages.

Morris, Corinne, et al., "Syntax PAL: a system to improve the written syntax of language-impaired users," Assistive Technology, 1992, vol. 4, No. 2, pp. 51-59, RESNA.

* cited by examiner

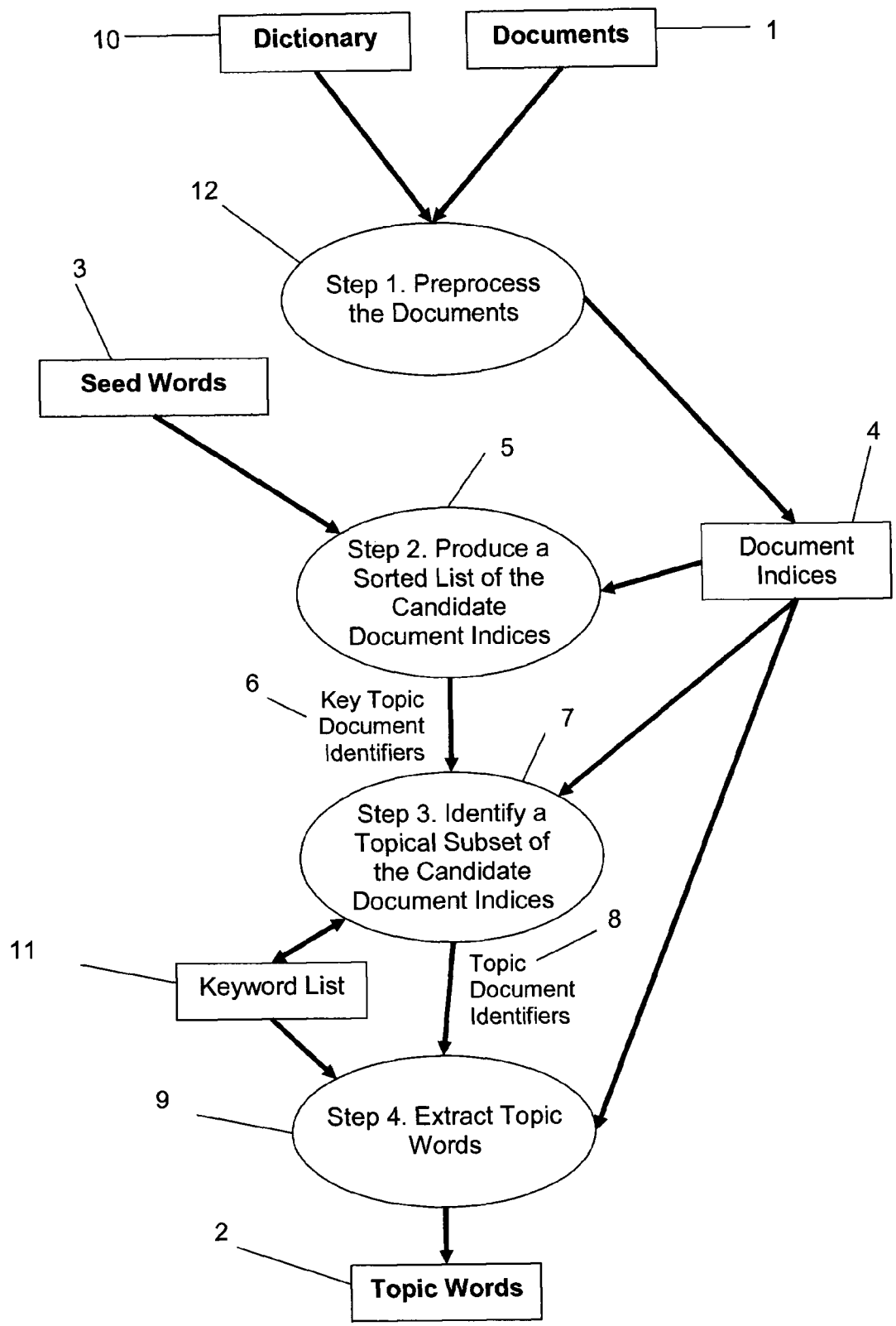

TOPIC WORD GENERATION METHOD AND SYSTEM

CROSS-REFERENCE TO RELATED APPLICATIONS

This application is a filing under 35 U.S.C. 371 of International Application No. PCT/CA2008/001972 filed Nov. 7, 2008 entitled "Topic Word Generation Method and System," claiming priority of Canadian Application No. 2,638,558 filed Aug. 8, 2008, which applications are incorporated by reference herein in their entirety.

FIELD OF INVENTION

The invention relates generally to automatic generation of topic words in response to input words specifying a topic.

BACKGROUND OF THE INVENTION

Digital computers with visual displays and user input devices are widely used to create text-based electronic documents such as e-mail messages and letters. Text is usually entered by the use of a keyboard attached to a personal computer, but may also be entered by means such as a touch sensitive display screen or a microphone combined with speech recognition software. A software application receives and processes the text, which may involve formatting, storage, and transmission of the accumulated entered text as directed by a user. These applications, typically called word processors, provide a digital means for a person to engage in the process of writing.

The writing process requires significant exercise of the user's intellect to decide what concepts to express, to express those concepts in grammatically-correct sentences using appropriate words, to physically enter those sentences into the computer, and to review and edit the entered text. It is a complex and time-consuming process for many. One challenge is that entry and editing by keyboard requires skill to hit the correct keys quickly in the correct order. Another challenge facing a writer is that the entry of text representing complex thought can be time consuming and frustrating, particularly with small systems using a small keyboard or touch screen. The user interface of the computer, which is managed by software receiving the input text, can substantially affect the speed of text entry and the quality of the text entered in many ways.

Interfaces have been devised to increase the speed and quality of entry in various ways such as by checking the spelling of words and grammar, and suggesting or automatically making corrections. Such capabilities may improve the quality of the text with respect to spelling and grammar, but do not assist a user in selecting an appropriate word for use in a particular context.

Systems that predict words based on partial word entry have been developed. These systems typically rely on word lists, knowledge of properties of the language being used, and information on how that language is normally used. Some systems use information about the frequency of use of words and the probability that a particular word will follow one or more other particular words in a sentence. Such systems typically either display their best prediction in a manner completing the current word being entered on the screen, giving the user a means to accept the suggested word, or allowing the user to type over it. Alternatively, they may display a list of several suggested words from which the user can choose one to complete the word being entered.

The effectiveness of such word prediction systems depends primarily on how often the intended word is displayed to the user, particularly where few or no letters of the word have been entered by the user. Basic word prediction systems, such as those based only on word lists, are likely to suggest words that are obviously inappropriate because the systems have no appreciation of the context. A suggested word may be grammatically incorrect, or may have no relationship to the subject matter of the text. This has led to various incremental improvements, such as evaluating the grammar and restricting suggestions to those that may be grammatically applicable (as in Morris C, et al. "Syntax PAL: a system to improve the written syntax of language-impaired users." Assist. Technol. 1992; 4(2):51-9.), and using multiple prediction techniques and then choosing one determined to be best (as in U.S. Pat. No. 5,805,911).

The probability that correct words will be suggested by a word prediction system can be increased by basing the list of possible words on the topic the user is writing about. Topical areas generally have differing vocabularies, and the frequency of use of particular words varies by topical area. For example, if a user is writing about baseball and the user enters the letters "ba" into an interface, it is more likely the user is writing the words "bat," "base," or "ball" than "bath" or "baby" given the topic, even if the latter words are more common in general usage. Some systems have attempted to use pre-defined topic word lists that may be customized by the user and selected for use by the prediction software. Some systems automatically select topic words, or require a user to manually identify topic words, from a document that the user identifies as topical. A problem with such systems is that they have a limited number of topic word sets, and there may not be an appropriate set for the user to select. The user may be left with choosing an inappropriate topic, with the result that the system will suggest inappropriate words that are unhelpful to the user.

When a user is writing about an unfamiliar topic, the user may not have the knowledge or the vocabulary to express in writing the user's thoughts. Systems that merely attempt to complete partially entered words do not assist users in identifying a suitable word to use in the context where the user may be unaware of the most suitable word, or its use had not occurred to the user. This may be a significant deficiency when the user is not very familiar with the topic the user is writing about, which can happen in many situations.

Approaches have been developed for the automatic extraction of keywords from sets of documents, generally in the context of document categorization and retrieval systems. Such systems may also assist in determining the best search words to use when searching a set of documents or the internet for information related to a particular topic. For example, U.S. Pat. No. 5,987,460 defines a method and system to extract and display keywords that operates on sets of documents that have been pre-selected to relate to a particular topic. Such a system would be of limited assistance to a user writing a document in selecting an appropriate word to use as it generates only a limited set of keywords for the purpose of refining a search.

BRIEF SUMMARY OF THE INVENTION

An object of the present invention is to provide for a system and method of generating topic words that are relevant to a topic specified by seed words.

The invention relates to a method generating topic words from at least one seed word and a collection of documents across multiple and potentially very large number of domains comprising the steps of:
- identifying keywords in each document that are indicative of the topic of the document;
- evaluating the relevance of each of the documents to the at least one seed word;
- identifying at least one key topic document that is relevant to the at least one seed word;
- selecting a subset of the documents, referred to as topic documents, by an iterative process starting with the selection of the at least one key topic document and then selecting other documents if their keywords are sufficiently similar to the keywords contained in the previously selected topic documents; and
- extracting a set of topic words from the topic documents.

The method may display the topic words.

The method may also pre-screen documents to eliminate documents that are too obscure or not topical. It may also limit the keywords considered to those in a pre-defined dictionary. The final set of topic words may be further reduced or modified for display or other purposes.

BRIEF DESCRIPTION OF THE DRAWING

The invention may be understood with reference to the accompanying FIGURE, identified as FIG. 1, which is a block diagram of a preferred embodiment of the method showing processing steps.

DETAILED DESCRIPTION OF THE INVENTION

In the preferred embodiment shown in FIG. 1, the method, implemented using software running on a programmable machine, generates a set of topic words 2 using an extraction algorithm that compares at least one seed word ("seed words") 3 with keywords derived from a collection of documents 1. The seed words 3, which may have been entered by a user, are words indicative of a topic. The extraction algorithm employs four major steps.

The first step in the extraction algorithm is to preprocess the documents 12 to create a set of document indices 4. Each selected document is converted into a document index which may include a document identifier, the document's title and a list of keywords extracted from the document. The list of keywords may include information indicating the frequency of occurrence of each keyword within the document and within the document's title.

The software to preprocess the documents 12 may eliminate documents in the collection of documents 1 so that no document indices are created for those eliminated documents. Documents larger than a predefined size may be eliminated on the basis that they are presumed to be general in nature rather than topical. Documents with more than a pre-defined percentage of words not contained in a pre-defined dictionary 10 may also be eliminated based on a presumption that these are too obscure to be useful. Other heuristics may also be employed to eliminate documents that may not be topical. The software to preprocess the documents 12 may thereby choose a subset of the collection of documents 1 which it uses to create the document indices 4 such that each document selected is more to likely to pertain to a single topic than those in the collection of documents 1 that are eliminated and not used to create document indices 4.

The software to preprocess the documents 12 may create a list of keywords for a document by including all words used in the document, but eliminating certain words from that list. It may eliminate words in a document not contained in the pre-defined dictionary 10 so that they are not included in the document's index. Words that serve structural purposes but convey no real meaning, such as "and" and "the," may also be eliminated. Multi-word proper names and multi-word common phrases may be combined and treated as a single keyword.

The second step is to produce a sorted list of candidate document indices 5, that include any seed words, based on relevance to the seed words and to identify at least one key or top topic document index that is highly relevant to the seed words 3. The relevance of a document index may be evaluated by comparison of the seed words 3 to (1) the title associated with the document and (2) keywords contained within the document index. Document indices with the highest relevance may be those with titles matching the seed words 3 exactly. Otherwise, relevance may be evaluated based on comparison with ranked keywords within the document index 4.

One method for ranking keywords within document indices is to rank them by, first, whether they appear in the document title, and, second, the number of times they appear in the document. A predefined number or percentage of the highest ranked keywords may then be defined to be highly ranked keywords for that document index. There are other methods of ranking keywords that would be applicable, as long as they are designed to ascribe a higher ranking to keywords that are indicative of the topic that is the subject of the document. Then the relevance or ranking of a document index for sorting purposes may be assessed by the number of seed words 3 that are highly ranked keywords for that document index, and secondly by the number of seed words 3 contained in the document index.

The document index 4 with the highest relevance may be evaluated to determine whether or not it is a sufficiently good match to the seed words 3. A document index may be determined to be a sufficiently good match with the seed words 3 if at least a predefined number or percentage of the seed words 3 are in the document's title or are highly ranked keywords for the document. If the document index is determined to be a sufficiently good match, then it is identified as a key topic document index. If no document index is a sufficiently good match, then all document indices may be considered to be key topic document indices. Alternatively, only those documents indices with at least a pre-defined level of relevance to the at least one seed word may be chosen to be key topic documents indices.

A key topic document index may be identified by the key topic document identifier 6 which is the document identifier in the document index 4.

As the previous Step 2 may result in any number of unrelated topics, the third step in the extraction algorithm is to identify a topical subset of the candidate document indices 7 identified in Step 2 that are most similar to the key or top topic document index, if such index is a sufficiently good match with the seed text. If the key topic document index is not a sufficiently good match with the seed text, then this subset operation is skipped and all candidate document indices are considered in Step 4.

The topical subset of the documents may be formed by first including the at least one key topic document's index or indices, and defining a keyword list 11 that consists of all the keywords in the at least one key topic document's index or indices. The keyword list 11 may also contain frequency data which indicates the frequency at which each keyword appears in the at least one key topic document's index or indices. The other candidate document indices 4 may be evaluated one at a time in declining order of relevance to the seed words 3. A document index may be deemed related if a pre-defined percentage of its keywords are contained in the keyword list 11. The frequency data may also be used to determine whether to include a document index in the subset. When a document index is incorporated into the subset, its keywords may then be incorporated into the keyword list 11. This Step 3 operation stops when a candidate document index fails to meet relevancy to the keyword list 11 or after all document indices 4 have been processed. The document indices contained in the selected subset then are the topic document indices, which are identified by their corresponding document identifiers 8.

The fourth step in the extraction algorithm is to extract topic words 9 from the topic document indices corresponding to the topic document identifiers 8. This step may start with the keyword list 11 formed in the third step. Keywords in the keyword list 11 that appear in fewer than a predefined number or percentage of topic document indices may be eliminated on the basis that they may not commonly be used in association with the topic. The predefined number or percentage used may be dependent upon whether at least one key topic document index was determined to be a sufficiently good match to the seed words 3 in the second step. Generally if at least one key topic document was determined not to be a sufficiently good match to the seed words 3, the predefined number or percentage used may be set to a higher number because the topic documents may not be as representative of the topic associated with the seed words 3. Keywords that appear in more than some predefined maximum number or percentage of all document indices 4 may also be eliminated on the basis that these words are too general to be considered relevant to the topic. The remaining words not eliminated from the keyword list 11 are the topic words 2.

The topic words 2 may be displayed, stored or used in a further process.

User input may be used to control or modify aspects of an embodiment. For example, the user may select a predefined dictionary 10 to be used, or may add or delete words from the predefined dictionary 10.

The invention may be used in conjunction with software that generates seed words, for example, from analyzing user-entered text, such as a partially written document or e-mail message. The software may choose the seed words by analysis of the text so that they are representative of the topic about which the user is writing. The software may permit the selection of displayed topic words by the user for incorporation into the text.

The topic words 2 may be used in conjunction with word prediction or correction software, for example, to assist in evaluating the probability that a user intends to enter a particular word. Words that appear in the set of topic words derived from seed words extracted from user-entered text may be more likely to be entered by the user and so word prediction or correction software may favour its choice of words to those identified as topic words, or may otherwise evaluate candidate words based on whether they are identified as topic words. In one embodiment, the extraction algorithm may also produce frequency of use data associated with each of the topic words 2. The frequency of use data may be used by word prediction software or correction software in evaluating the probability that a user intends to enter a particular word.

The invention may also be used in conjunction with software that processes the topic words 2 and displays a derived set of words. Such software may permit user control over the nature or number of derived words so as to make the display more useful to the user. In one embodiment, the topic words 2 are displayed to a user as part of a writing environment.

In one embodiment, at least one document in the collection of documents is obtained from a specified source, such as a user selected topic document, a folder or collection of files stored on the user's hard drive or other personal storage device, or the Internet or other online, collaborative or networked source. The topic words 2 that were extracted from the documents from a specified source may be identified as such in the output. For example, the topic words that were derived from a website could be highlighted in the website, so that the appropriate use of these topic words may be inferred by the user in the context of the original source. In another embodiment, extracts of the source document showing the context for topic word use are linked to the generated topic word so that a user may access the extract by using or selecting the topic word 2.

In one embodiment, multiple collections of documents may also be pre-processed to form one collection that shares some commonality, such as age/writing level, or overall theme. The user may then choose a collection from which to extract topic words.

The invention can grow its knowledge of topics through the addition of new documents that are pre-processed and added to the document indices. The new documents may be identified by the user, by updates or additional modules provided by a vendor, or otherwise identified and made available to the algorithm for processing.

In one embodiment, the topic words are further processed to group together topic words that have common morphological roots, so that redundant topic words may be eliminated from the results, e.g., "claim," "claiming," "claimed" would be listed as just one word, "claim." The topic words could also be refined based on user choices, such as the total number of desired words. The software may include executable code stored in a memory for execution by a processor. A memory may include any static, transient or dynamic memory or storage medium, including without limitation read-only memory (ROM) or programmable ROM, random access registers memory (RAM), transient storage in registers or electrical, magnetic, quantum, optical or electronic storage media. A process includes any device or set of devices, howsoever embodied, whether distributed or operating in a single location, that is designed to or has the effect of carrying out a set of instructions, but excludes an individual or person. A system implemented in accordance with the present invention may comprise a computer system having memory and a processor to execute the code. The system may also comprise a server and client structure, where the user is writing on a client terminal, including a wireless handheld device or cell phone, and the method is performed on a server. In such an embodiment client device may send the seed words to the server, and the server would return predicted words or a set of topic words based on the seed words.

It will be appreciated that the above description relates to the preferred embodiments by way of example only. Many variations on the method and system for delivering the invention without departing from the spirit of same will be clear to those knowledgeable in the field, and such variations are within the scope of the invention as described and claimed, whether or not expressly described.

What is claimed is:

1. A method of generating topic words from at least one seed word and a collection of electronic documents comprising the steps of:
   a. identifying keywords in each document that are indicative of the topic of the document;

b. evaluating the relevance of each of the documents to the at least one seed word;

c. identifying at least one key topic document that is relevant to the at least one seed word;

d. selecting a subset of the documents, referred to as topic documents, by an iterative process starting with the selection of the at least one key topic document and then selecting other documents if their keywords are sufficiently similar to the keywords contained in the previously selected topic documents; and e. extracting a set of topic words from the topic documents, wherein the steps of the method are performed by a computer processor running software.

2. The method of claim 1 wherein each document comprises an index, and the evaluation step comprises producing a sorted list of document indices that include the at least one seed word based on relevance to the at least one seed word, and to identify at least one key topic document index that is highly relevant to at least one seed word.

3. The method of claim 2 wherein the relevance of a document index is evaluated by comparison of the at least one seed word to the title of each document and keywords contained within each document index.

4. The method of claim 1 wherein in the step of identifying keywords, words contained in a pre-defined dictionary are excluded from consideration as keywords.

5. The method of claim 1 wherein in the step of identifying keywords, words that serve structural purposes are excluded from consideration as keywords.

6. The method of claim 1 wherein in the step of evaluating the relevance of each of the documents, documents determined to be unlikely to pertain to a single topic are eliminated prior to identifying the at least one key topic document.

7. The method of claim 1 wherein the relevance of a document to the at least one seed word is determined based on the frequency of occurrence of the seed words in the title of the document and within the document.

8. The method of claim 1 wherein the at least one key topic document is chosen to be the document that is most relevant to the at least one seed word if that document is sufficiently relevant to the at least one seed word and otherwise all documents with at least a pre-defined level of relevance to the at least one seed word are chosen to be key topic documents.

9. The method of claim 1 wherein the topic documents include the at least one key topic document and the other topic documents are selected by an algorithm that considers each document, one at a time, in declining order of relevance to the at least one seed word, and selects a document as a topic document if it contains at least a predefined percentage of keywords that occur as keywords of the previously selected topic documents.

10. The method of claim 1 wherein at least one document in the collection of documents is obtained from a specified source.

11. The method of claim 1 wherein the extracted topic words are further processed to eliminate redundant topic words having common morphological roots.

12. The method of claim 1, wherein the collection of documents is pre-processed such that each document in the collection of documents shares a commonality.

13. A memory having recorded thereon statements and instructions for execution by a computer to carry out the method of claim 1.

14. A method comprising transmitting over a communications medium computer-executable instructions for causing a computer system programmed thereby to perform the method of claim 1.

15. The method of claim 1 wherein the at least one seed word is obtained by analyzing user-entered text.

16. A computer system for extracting topic words from electronic documents based on at least one seed word comprising:

a. a programmable computer processor;

b. a memory readable by the processor; and c. software stored in the memory for execution by the processor, the software comprising:

i. a keyword identification module for identifying keywords in each document that are indicative of the topic of the document;

ii. an evaluation module for evaluating the relevance of each of the documents to the at least one seed word;

iii. a key topic document identification module for identifying at least one key topic document that is relevant to the at least one seed word;

iv. a selection module for selecting a subset of the documents, referred to as topic documents, by an iterative process starting with the at least one key topic document and then selecting other documents if their keywords are sufficiently similar to the keywords contained in the previously selected topic documents; and v. an extraction module for extracting a set of topic words from the topic documents.

17. The system of claim 16 wherein each document comprises an index, and the evaluation module produces a sorted list of document indices that include the at least one seed word based on relevance to the at least one seed word, and identifies at least one key topic document index that is highly relevant to at least one seed word.

18. The system of claim 17 wherein the relevance of a document index is evaluated by comparison of the at least one seed word to the title of each document and keywords contained within each document index.

19. The system of claim 16 wherein in the step of identifying keywords, the keyword identification module excludes words contained in a pre-defined dictionary from consideration.

20. The system of claim 16 wherein in the step of identifying keywords, the keyword identification module excludes words that serve structural purposes.

21. The system of claim 16 wherein the system further comprises a filtering module for eliminating documents determined to be unlikely to pertain to a single topic prior to the execution of the keyword identification module.

22. The system of claim 16 wherein the relevance of a document to the at least one seed word is determined by the evaluation module based on the frequency of occurrence of the seed words in the title of the document and within the document.

23. The system of claim 16 wherein the at least one key topic document is chosen by the key topic document identification module to be the document that is most relevant to the at least one seed word if that document is sufficiently relevant to the at least one seed word and otherwise all documents with at least a pre-defined level of relevance to the at least one seed word are chosen to be key topic documents.

24. The system of claim 16 wherein the topic documents are selected by the selection module to include the at least one key topic document and the other topic documents are selected by an algorithm that considers each document, one at a time, in declining order of relevance to the at least one seed word, and selects a document as a topic document if it con tains at least a predefined percentage of keywords that occur as keywords of the previously selected topic documents.

25. The system of claim 16 wherein at least one document in the collection of documents is obtained from a specified source.

26. The system of claim 16 wherein the extracted topic words are further processed to eliminate redundant topic words having common morphological roots.

27. The system of claim 16, wherein the collection of documents is pre-processed such that each document in the collection of documents shares a commonality.

28. The system of claim 16 wherein the at least one seed word is obtained by analyzing user-entered text.

* * * * *